United States Patent Office.

JAMES H. COLE, OF CHICAGO, ILLINOIS.

Letters Patent No. 110,343, dated December 20, 1870.

IMPROVEMENT IN ROOFING-MATERIALS.

The Schedule referred to in these Letters Patent and making part of the same.

*To all whom it may concern:*

Be it known that I, JAMES H. COLE, of the city of Chicago, in the county of Cook and State of Illinois, have invented a certain new and useful Roofing-Composition, of which the following is a full description, both as regards the material itself and the mode of preparing it, sufficient to enable others skilled in the art to make and use the same.

In manufacturing my composition the following ingredients are used, viz: Louisville cement, sand, gypsum, resin, and coal-tar.

I first heat, in kettles over a suitable fire, the coal-tar to at least boiling point, and keep it in that state until it is reduced to the consistency of paving-tar, or until all the water and most of its volatile elements are evolved. I then add to one barrel of the coal-tar, while in the heated state, one-eighth of a barrel of melted resin, which serves to thicken the coal-tar while hot, and to give consistency and hardness to it when cold. I then take, in a perfectly dry state, six parts of sand, one part of Louisville cement, and one part of pulverized gypsum, and thoroughly mix them together, and this composition I gradually pour into the kettle containing the heated coal-tar and resin, stirring all the time so as to thoroughly incorporate the mass, producing a composition of about the consistency of common mortar.

This composition can be made into sheets with my roofing device, secured to me by Letters Patent dated May 19, 1868, and numbered 78,014, or it can be applied in the usual manner. In either case it should have a paper or other suitable fabric foundation.

The composition, made as above described, does not disintegrate when exposed to the action of the elements, neither is it rendered too plastic by the action of the sun, nor so brittle from exposure to frosts as to seam or crack. It is, therefore, well adapted for the purpose intended.

I am aware that all the ingredients of my composition have been used with others in a concrete pavement, and I therefore wish it to be understood that I do not claim the exclusive right to a compound of these ingredients; but Having fully described my invention,

What I claim as new, and desire to secure by Letters Patent, is—

The combination of the ingredients herein specified, with a paper or other suitable fabric for a foundation, for roofing purposes, substantially as described.

JAMES H. COLE.

Witnesses:
FRANCIS W. COREY,
WM. O. COLE.